United States Patent [19]

Schenz

[11] 4,201,819
[45] May 6, 1980

[54] LAMINATED CHIPBOARD

[75] Inventor: Manfred Schenz, Gittelde, Fed. Rep. of Germany

[73] Assignee: Wilhelm Mende & Company, Harz, Fed. Rep. of Germany

[21] Appl. No.: 767,345

[22] Filed: Feb. 10, 1977

[30] Foreign Application Priority Data

Dec. 15, 1976 [DE] Fed. Rep. of Germany ....... 2656713

[51] Int. Cl.² .......................... B32B 3/00; B32B 3/28
[52] U.S. Cl. ...................... 428/172; 156/62.2;
428/174; 428/179; 428/182; 428/332; 428/337;
428/402; 428/464
[58] Field of Search ............... 428/146, 326, 182, 184,
428/402, 461, 511, 156, 172, 162, 164, 464, 179;
156/62.2, 62.4, 320, 321; 264/109

[56] References Cited

U.S. PATENT DOCUMENTS

| 2,544,169 | 3/1951 | Manning et al. ...................... 156/321 |
| 3,180,779 | 4/1965 | Conger et al. ....................... 428/164 |
| 3,476,585 | 11/1969 | Fraser et al. ......................... 428/460 |
| 3,575,793 | 4/1971 | Paisley ................................. 156/320 |
| 3,793,125 | 2/1974 | Kunz .................................... 428/326 |
| 3,846,219 | 11/1974 | Kunz .................................... 428/326 |
| 3,905,849 | 9/1975 | Bomboire ............................. 428/156 |
| 3,956,543 | 5/1976 | Stangeland ........................... 428/179 |

FOREIGN PATENT DOCUMENTS

51-7083 1/1976 Japan ...................................... 428/461

*Primary Examiner*—P. J. Thibodeau
*Attorney, Agent, or Firm*—Allegretti, Newitt, Witcoff & McAndrews

[57] ABSTRACT

A chipboard having bonded thereto a sheet metal lamination is disclosed. The sheet metal stretches and contracts in response to dimensional changes in the chipboard without becoming detached therefrom, thereby improving and preserving the strength and integrity of the chipboard. Also disclosed is a method of manufacturing thin laminated chipboard wherein a thermoplastic material, securely connected or bonded to a sheet of non-thermoplastic material, is laminated to the chipboard by contacting the thermoplastic film against the chipboard while applying heat and pressure against the non-thermoplastic material.

7 Claims, 4 Drawing Figures

LAMINATED CHIPBOARD

BACKGROUND OF THE INVENTION

The invention relates to a chipboard wherein a lining or lamination adheres to the surface thereof by means of an adhesive substance. The present invention also relates to a method of laminating thin chipboards with sheet material using a press, the press having a heated roll and a belt, under tension, which partly loops about the roll. The belt arrangement is such that the thin chipboard and a sheet of non-thermoplastic material, preferably printed paper or textile fabric, positioned on the side of the chipboard nearest the roll, are guided into the gap which exists between the belt and the roll, and at the same time thermoplastic material is introduced between the non-thermoplastic sheet and the chipboard.

German published specification P 22 01 302 describes a press for laminating thin sheets to thin chipboards, characterized by a heated roll, means for the continuous introduction of a web of sheet material of thermoplastic type between the heated roll and the thin chipboard running on to the roll, and a belt, under tension, which is partly looped about the roll and which presses the thin chipboard and the sheet against the surface of the roll. The roll is maintained at a temperature at which the plastic material is brought to a plastic state, and, together with the sheet of thermoplastic material and the thin chipboard, a web of printed paper or textile fabric runs on to the heated roll on the side of the thermoplastic sheet remote from the chipboard. Laminating chipboards with printed paper with the use of thermoplastics as binder has the great advantage that heating of the thermoplastic sheet and of the chipboard is required only on the chipboard surface facing the thermoplastic sheet. This not only results in a saving in heat but more importantly obviates blistering, since the substantially vapor-impervious chipboard does not reach a temperature at which vapor could be formed which would tend to lift the generally vapor-impervious paper thus forming blisters. It is also proposed to apply a thermoplastic film on the side of the paper web remote from the chipboard to provide a watertight covering for the paper.

When using a press of this kind there is a disadvantage in that the heating of the thermoplastic sheet before passing it into the gap between roll and belt cannot be avoided, particularly because of heat radiation. Therefore, there is a risk that the thermoplastic sheet material may become plastic before it is taken up into the pressure gap. As a result, the thermoplastic sheet tears, primarily because the thermoplastic sheet is under tension to avoid distortion on running into the press gap.

A further disadvantage is that the paper of the binder shrinks to a considerable extent. When this occurs, the finished laminated board develops a curvature. Measures which may be taken to remove any such curvature run the risk of tearing the paper, particularly since not only the paper but also the wood in the chipboard is subjected to considerable modifications in length in accordance with its particular moisture content.

A further disadvantage of a board lamination in this way is that the surface is not weather-resistant.

SUMMARY OF THE INVENTION

The invention has as its object to provide a method wherein heating of the thermoplastic material effecting the bond between the sheet of non-thermoplastic material, i.e. paper, and the chipboard does not result in the disadvantages of the prior art. In this connection it is known to apply externally, onto the paper layer, another thermoplastic layer which is intended to provide resistance to weather. However, thermoplastic material is relatively sensitive to mechanical stresses, and is not sufficiently resistant to long exposure to sunshine.

The invention is thus directed to provide a laminated chipboard which has a surface resistant to mechanical stress and to weather, wherein length variations between the laminated layer and the chipboard cannot result in damage.

The object of the invention is achieved in that the laminated layer is sheet metal, more particularly aluminum sheet.

Sheet metal is relatively more resistant to mechanical influences and also less sensitive to weather influences than plastics, particularly if sheet aluminum is used. Chipboards having a laminated sheet metal construction can be used in interior furnishings and fittings, particularly in facades and in coachwork, e.g. caravans. Previous chipboard products could not be used in these applications. In addition, the sheet metal gives the material a high bending strength per unit, a property which is particularly useful in vehicle construction. The chipboard according to the invention can be simply positioned on simple frames or other structures by simple connecting methods normally used in joinery and other woodwork.

Finally, laminating with sheet metal has also the advantage of good insulation against the radiation heat. Durable paints can be applied without difficulty to the metal.

According to a further feature of the invention, the elongation of the sheet metal is chosen so that the tensile stresses caused by relative length variations between metal and chipboard on bending, thermal expansion or shrinkage because of moisture variations, do not exceed the shearing stresses which the binder can accept. This obviates the risk of the sheet metal becoming detached from the chipboard. When there are variations in length, e.g under the action or heat, the sheet metal stretches or contracts correspondingly so that there is no danger of the laminated layer detaching from the chipboard. At the same time it is convenient also to dimension the chipboard so that it can accept length variations without the shearing forces between chipboard and lamination becoming too great. Dimensioning in this way is made possible since, according to the present invention, the sheet metal lining increases the bending strength and the surface strength or stability.

For dimensioning the elongation appropriately, as proposed by the invention, the sheet metal is plane and has a thickness which over the entire surface area is equal to or less than the thickness at which the elongation is sufficient to avoid exceeding the shearing forces which the binder can accept. To obtain the same object it is also possible to give the sheet metal a structure comprising small corrugations or other departures from a plane form, which become deformed when tensile stresses occur and cause an increase in the elongation. By suitably dimensioning the thickness of the metal sheet and providing a structure consisting of local bends, the elongation can easily be adapted to the ability of the binder to accept shearing forces, and, if a suitably corrugated structure is used, the surface appearance can be improved.

The spacing of the depressions and proturberances forming the departures from the plane is preferably in the 2 to 8 mm range, so as to avoid permanent deformations due to forces acting on the surface. At the same time, of course, it is possible, depending on the extensibility of the binder, to connect the lamination with the chipboard not only in the region of the protuberances, which contact the surface of the chipboard but also by filling all the spaces between the laminations and the chipboard.

The thickness of the sheet metal is such that the metal sheet is not influenced by the surface structure of the chipboard. Conveniently the thickness of the sheet metal is in the range of about 0.2 to about 0.8 mm, and preferably amounts to about 0.6 mm. The thickness of the chipboard is preferably about 2.5 to 6 mm.

The invention also concerns a method which is particularly suitable for the production of the chipboard according to the invention and which is characterized in that the thermoplastic material is introduced into the gap between roll and belt in the form of a film connected securely to the sheet of non-thermoplastic material before the press is reached.

Thus, according to the present invention, the thermoplastic material effecting the bond is introduced, not in the form of a freely entering and tensioned sheet, but in the form of a film firmly connected to the non-thermoplastic sheet. With this method the thermoplastic material can be plastic and even liquid, since it is connected securely to the non-thermoplastic, and thus, dimensionally stable sheet.

To produce the chipboard according to the pesent invention, sheet material or metal foil, more particularly metal foil consisting of aluminum, is used as the sheet of non-thermoplastic material. With metal foil or sheet the applied layer of non-thermoplastic material is heated particularly quickly and intensively in the press gap. This particularly strong preliminary heating of the thermoplastic material permits relatively short pressing times in the press gap. In addition, the sheet metal has particularly good dimensional stability.

According to another feature of the method of the present invention, at the side nearest the roll, a layer of thermoplastic material is introduced into the gap between the roll and the belt, the layer being securely connected to the sheet of non-thermoplastic material before the press is reached. In this feature, the same advantage results if the sheet of non-thermoplastic material, e.g. printed paper, is to be covered in water-tight fashion at the external side.

DETAILED DESCRIPTION OF THE INVENTION

The invention will be explained in detail by reference to the attached drawings.

Figure 2:
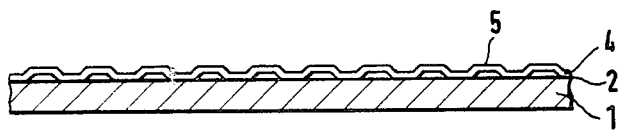
FIG. 2 shows another example of the present invention having a lamination with a corrugated structure.
Figure 3:
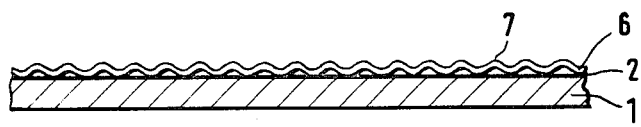

FIG. 3 corresponds substantially to FIG. 2 and shows another corrugated structure.

Figure 4:
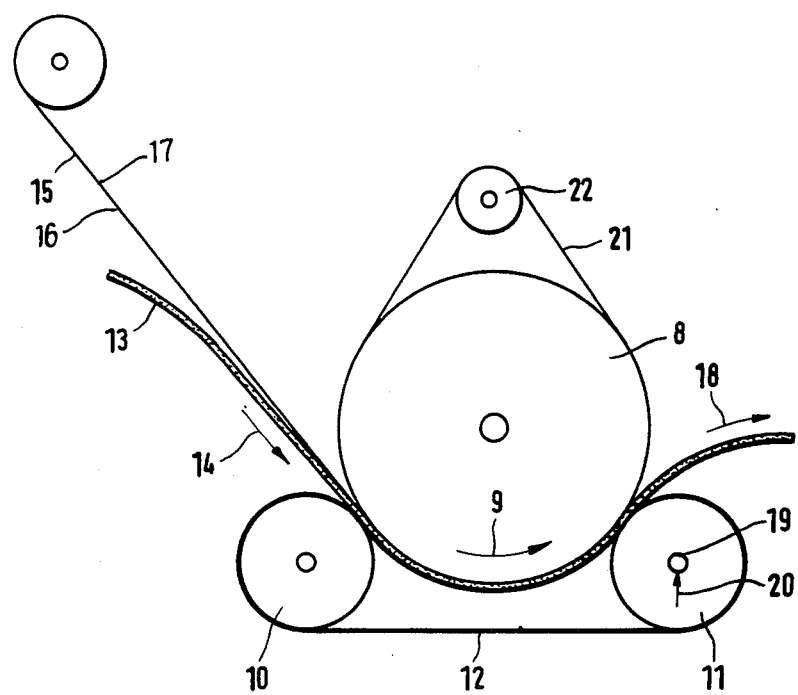

FIG. 4 shows a press for performing the method of the present invention.

Figure 1:
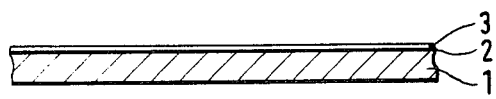
FIG. 1 shows in section, an example of a laminated chipboard manufactured according to the present invention.

In FIGS. 1 to 3 a chipboard 1 is illustrated. In FIG. 1 a flat metal sheet 3 with a thickness of 0.6 mm adheres to the surface of the chipboard 1 having a thickness of about 3 mm. The metal sheet 3 consists of aluminum and has such elongation properties that with normal elongation of the chipboard 1 and the usual bending stresses and the stresses caused by heat and moisture the shearing forces on the binder do not exceed a permissible amount, and thus lifting or separation of the sheet 3 from the chipboard 1 is prevented.

In the embodiment illustrated in FIG. 2 there is used as the laminated layer a metal sheet 4 which comprises corrugations 5 formed by sinuously curved portions in the sheet 4. These curves may be in the form of ridges extending parallel over the sheet, or may be in the form of isolated protuberances or local peaks and valleys, so that by deformation of those bends, length variations can be accommodated. As a result, the longitudinal stresses and thus the forces on the binder 2 do not exceed the allowable limit.

In the embodiment illustrated in FIG. 3, a sheet 6 is used whose corrugations are formed of individual protuberances 7 bent from the sheet.

In the press apparatus illustrated in FIG. 4, a heated roll 8 turns continuously in the direction of the arrow 9 and has a belt 12 looped about it in the pressing zone between a guide roll 10 and pressure application roll 11. Belt 12 consists of steel or a steel mesh coated with a heat-resistant plastic material.

A preferably endless thin chipboard 13 runs continuously in the direction of arrow 14 into the space between the belt 12 and the surface of the roll 8. The chipboard 13 runs together with a sheet 15, consisting of a web of paper 17 on which a thin film of thermoplastic material 16 is already applied in the press gap between the roll 8 and the belt 12. The paper web 17 can also be printed with an imitation wood veneer pattern.

In the pressing zone in which the belt 12 loops about the roll 8, the chipboard 13 is pressed against the sheet 15, which is thus pressed securely against the surface of the roll 8. As a result heat flows from the heated roll 8 through the paper web 17 into the thermoplastic material film 16 and on into the surface area of the chipboard web 13. The temperature of the roll 8 and the gap length formed between the belt 12 and the roll 8 are chosen so that the thermoplastic film 16 is ultimately fixed to the surface of the chipboard 13. The paper web 17 is thus securely attached to the chipboard 13.

After pressing and joining have been completed, the chipboard 13 with the securely laminated material on it, issues from the press gap in the curved region of the belt 12 in the direction of an arrow 18.

To keep the belt 12 continuously under tension, shaft 19 of the pressure application roll 11 is preloaded in the direction of an arrow 20.

If, according to another embodiment of the invention, a paper web is used which is provided at both sides with a thermoplastic layer, the roll 8 is conveniently provided with a co-running belt 21 which is looped about it and which is held tensioned by the roll 22 to prevent the film 16 from sticking to the surface of the roll 8. Belt 21 preferably consists of a material of poor adhesive properties, e.g. polytetrafluoroethylene or silicone.

As illustrated in FIG. 4, even before the press gap is reached, the sheet 15 is already in the heat radiation zone of the roll 8. The heating of the film of thermoplastic material 16 which is thus brought about is, however, not a disadvantage, since the film 16 is held securely by the paper web 17. It is even possible to carry out preheating of the film from an additional heat source so that the duration of the pressing operation can be reduced. The effect of this apparatus is that the depth to which the heat penetrates into the chipboard 13 is reduced and thus saving heat and reducing the risk of blistering further.

I claim as my invention:

1. A laminated chipboard comprising:
   a chipboard sheet having a generally planar surface;
   a metal sheet; and
   a thermoplastic binder interposing the chipboard sheet and the aluminum sheet, the thermoplastic binder binding the aluminum sheet to the surface of the chipboard sheets;
   the aluminum sheet having a substantially uniform thickness within a first range of about 0.2 mm to 0.8 mm and the chipboard sheet having a substantially uniform thickness within a second range of about 2.5 mm to 6.0 mm, the aluminum sheet having a thickness within the first range so that the aluminum sheet is not influenced by the surface structure of the chipboard sheet, and the aluminum sheet and the chipboard sheet having thicknesses within the first range and the second range, respectively, so that the relative thickness of the aluminum sheet and the chipboard sheet are such that tensile stresses occuring between the aluminum sheet and the chipboard sheet due to relative length variations caused by bending, thermal expansion and shrinkage from moisture variations do not exceed the shearing forces which can be accepted by the thermoplastic binder and therefor do not cause the aluminum sheet to become detached from the chipboard sheet.

2. A chipboard according to claim 1 wherein the aluminum sheet is shaped to provide small corrugations therein which deform when tensile stresses occur.

3. A chipboard according to claim 2 wherein the corrugations comprise bends which form a relief effect on the aluminum surface.

4. A chipboard according to claim 3 wherein the corrugations comprise protuberances.

5. A chipboard according to claim 2 wherein the spacing of the valleys and peaks forming the corrugations are between 2 and 8 mm thereby obviating permanent deformations due to forces acting on the surface.

6. A chipboard according to claim 1 wherein the thickness of the aluminum sheet is such that the aluminum sheet is not influenced by the surface structure of the chipboard.

7. A chipboard according to claim 1 wherein the sheet is about 0.6 mm thick.

* * * * *